(12) United States Patent
Bluhm

(10) Patent No.: US 7,445,263 B1
(45) Date of Patent: Nov. 4, 2008

(54) SLIDING PLATFORM FOR A PICK-UP TRUCK

(76) Inventor: Jason Bluhm, 15 Hawthorne Crescent, Townsend, ON (CA) N0A 1S0

( * ) Notice: Subject to any disclaimer, the term of this patent is extended or adjusted under 35 U.S.C. 154(b) by 0 days.

(21) Appl. No.: 11/796,692

(22) Filed: Apr. 30, 2007

(51) Int. Cl.
*B60P 3/34* (2006.01)
(52) U.S. Cl. .................................. 296/26.09
(58) Field of Classification Search ............. 296/26.09, 296/26.08, 3, 37.6; 248/500; 224/524, 319, 224/402
See application file for complete search history.

(56) References Cited

U.S. PATENT DOCUMENTS

| | | | | |
|---|---|---|---|---|
| 4,993,088 A * | 2/1991 | Chudik | ...................... | 296/26.09 |
| 5,544,998 A * | 8/1996 | Malinowski | .............. | 296/26.09 |
| 5,688,087 A * | 11/1997 | Stapleton et al. | ............. | 410/150 |
| 5,755,549 A * | 5/1998 | Ogrodnick | ................... | 414/500 |
| 5,772,229 A * | 6/1998 | Cattau | ...................... | 280/438.1 |
| 5,934,725 A * | 8/1999 | Bowers | .................... | 296/26.09 |
| 6,312,034 B1 * | 11/2001 | Coleman et al. | .......... | 296/26.09 |
| 6,464,274 B2 * | 10/2002 | Mink et al. | ............... | 296/26.09 |
| 6,705,656 B2 * | 3/2004 | Keller | ....................... | 296/26.09 |
| 7,083,219 B1 * | 8/2006 | Gregory | ................... | 296/26.09 |
| 7,121,603 B2 * | 10/2006 | Stevenson et al. | ......... | 296/26.09 |
| 7,125,082 B2 * | 10/2006 | Copus | ......................... | 298/1 A |
| 7,240,939 B2 * | 7/2007 | Vandekerkhof et al. | .. | 296/26.09 |

* cited by examiner

*Primary Examiner*—Kiran B. Patel
(74) *Attorney, Agent, or Firm*—Edward H. Oloham

(57) ABSTRACT

A sliding platform is mounted on low friction rollers to cooperate with a stationary frame to produce an extending platform for the cargo area of a suitable vehicle. The stationary frame may be fastened in the cargo area of a motor vehicle by means of specially shaped bolts which attach the stationary frame to the front wall of the cargo area. The forward end of the stationary frame is therefore held in place by means of only two fastening bolts. The rearward portion of the stationary frame is located and held in place by two jackscrews which serve to engage the two opposing walls of the cargo bay.

A spring loaded handle is used to unlatch the sliding platform and allow it to be slid on said stationary frame to an extended position. The spring loaded handle may be pulled out from its nested position to provide better access and gripping of the handle.

5 Claims, 5 Drawing Sheets

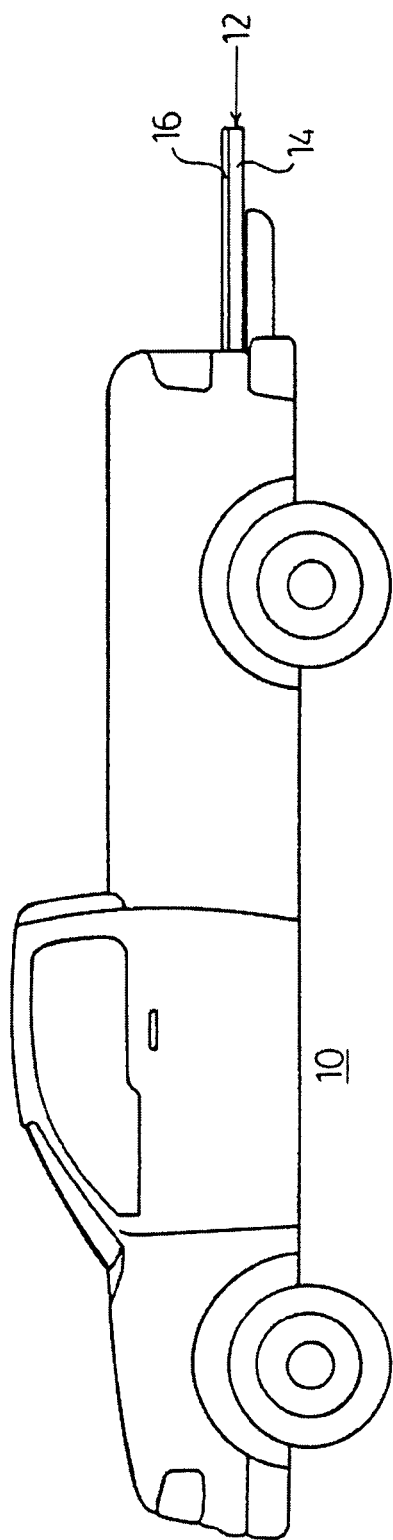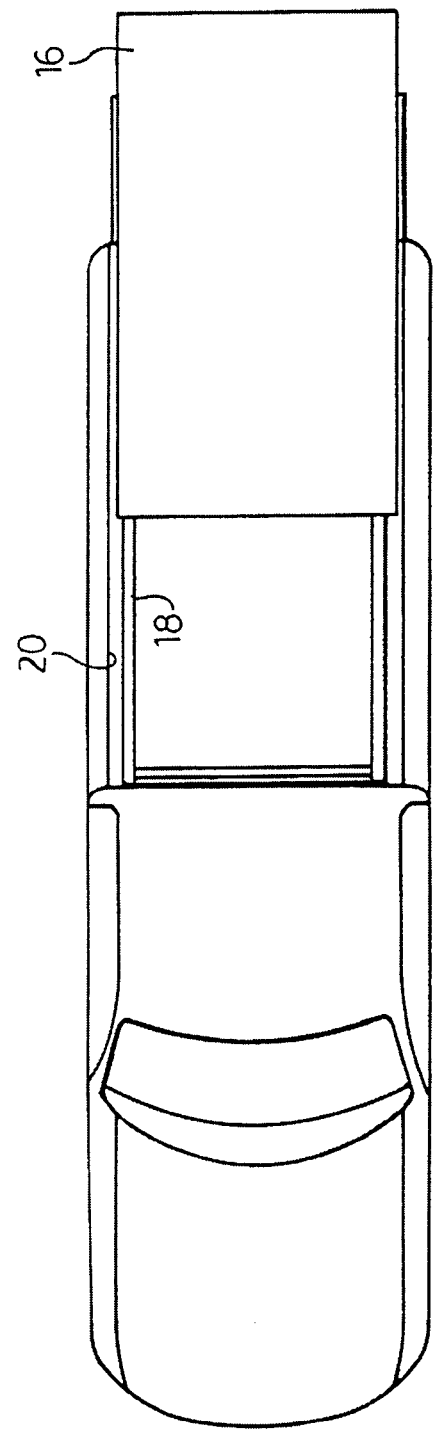

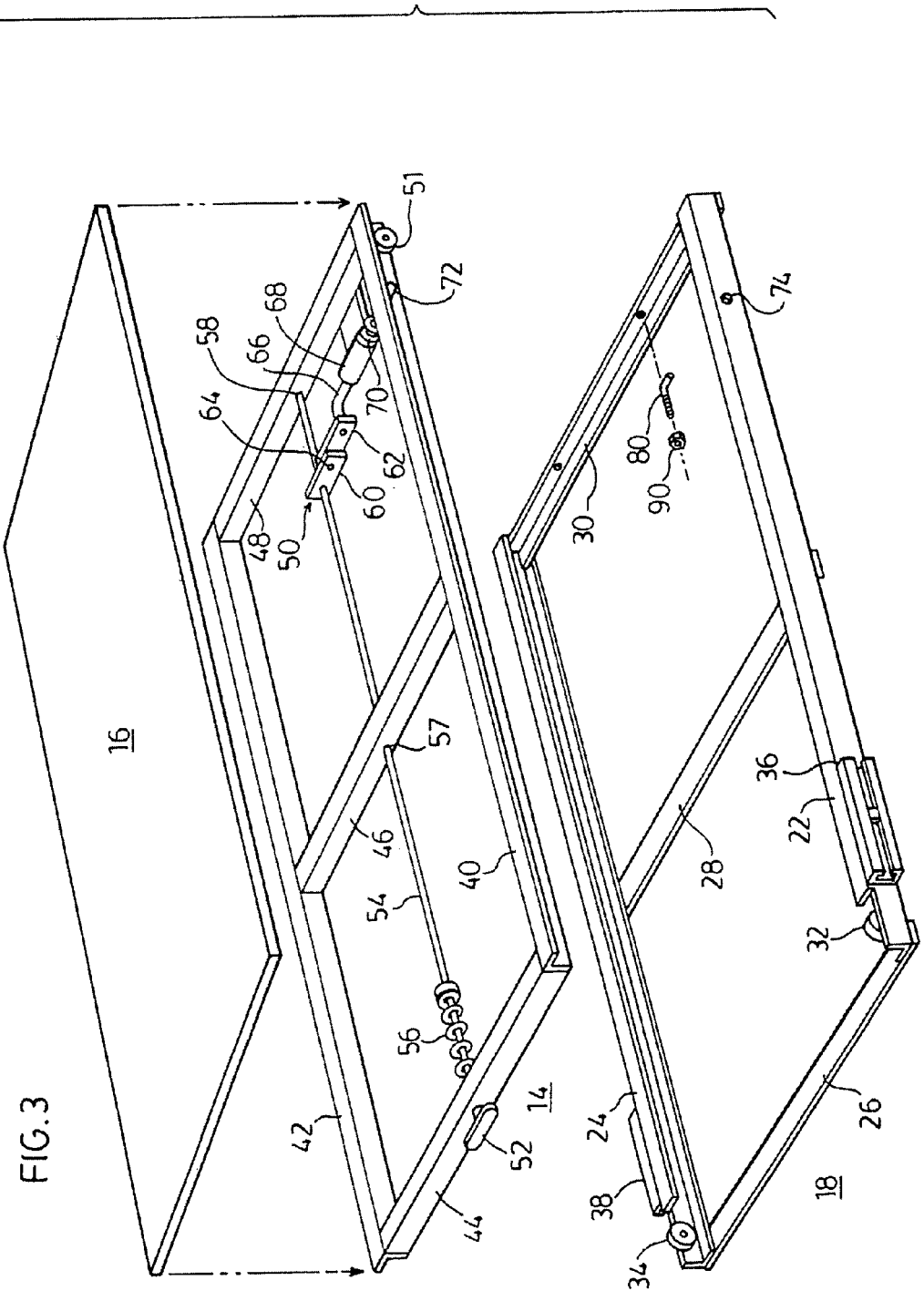

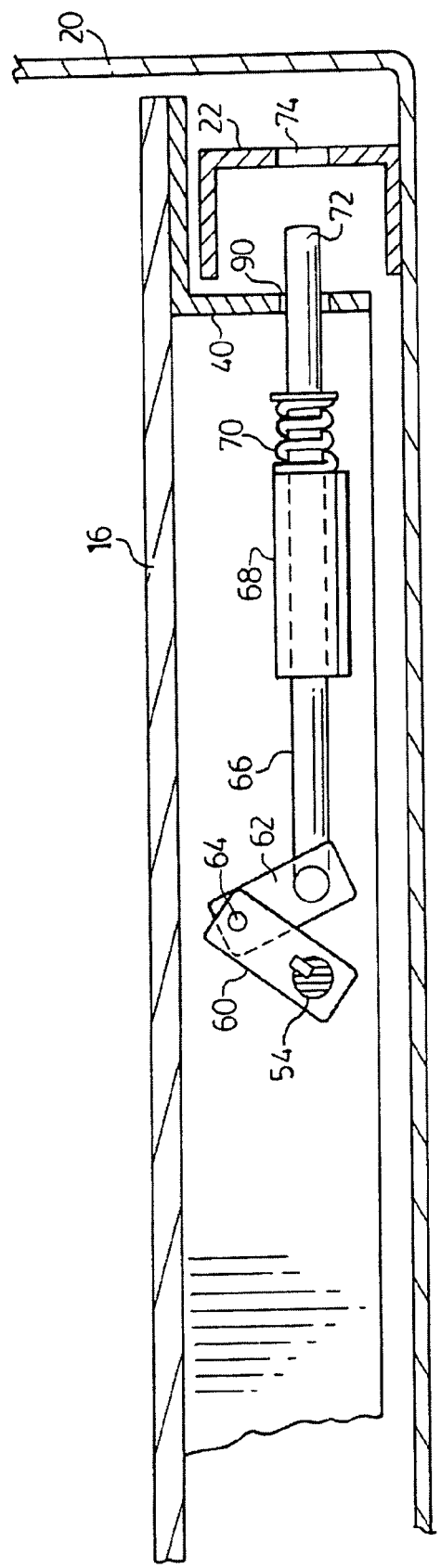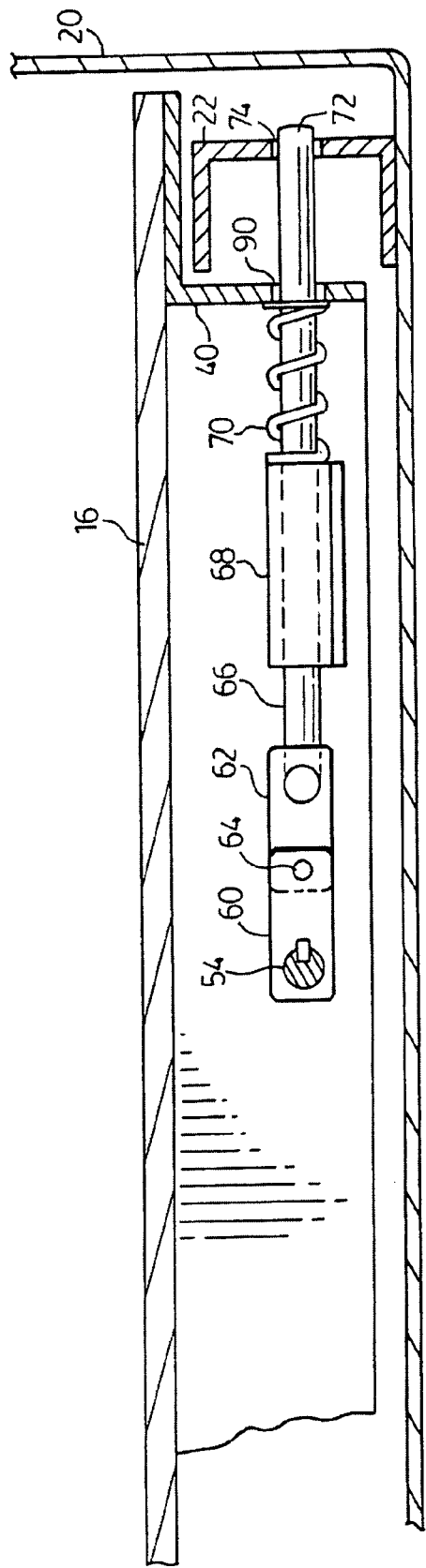

SLIDING PLATFORM FOR A PICK-UP TRUCK

FIELD OF INVENTION

This invention relates to a sliding platform which is installed in the cargo bay of a modern pick up truck. The sliding platform enables the user to slide the platform rearwardly and gain access to items stored at the front of the cargo bay.

BACKGROUND OF THE INVENTION

Sliding platforms for cargo bays of pick up trucks have been known and used for some time (see U.S. Pat. No. 4,824,158 dated Apr. 25, 1989). Some of these devices are extremely cumbersome and difficult to install. Others require the installation of special brackets to hold the sliding apparatus in place in the cargo bay. These brackets may be difficult to install and present unwanted intrusion into the cargo bay when the sliding platform apparatus is removed. Other installations require partial disassembly of the sliding apparatus when it is desired to remove or install the sliding platform from the cargo bay. It is especially difficult to remove or install the sliding platform when standard bolts and nuts are used to hold the sliding apparatus in place in the cargo bay. It is first necessary to provide holes in the box of the pick up vehicle at points (which may be almost inaccessible) in the front and/or bottom of the cargo box, and then one must gain access to threaded ends of the mounting bolts which must protrude through the front and bottom of the cargo box in order to fasten or unfasten the sliding platform apparatus in the cargo area. This means that someone must gain access to the area where the mounting bolts protrude.

It must be remembered that if the sliding platform is to be installed and removed on a regular basis, that installation procedure is important.

SUMMARY OF THE INVENTION

This sliding platform of this invention makes use of fasteners which do not require the disassembly of any part of the sliding apparatus in order to install the device.

BRIEF DESCRIPTION OF THE DRAWINGS

This invention is illustrated by way of example, and not by way of limitation, in the figures of the accompanying drawings in which like reference numerals refer to similar elements of the device.

FIG. 1 is an elevational view of a truck showing a sliding table installed.

FIG. 2 is a plan view of a truck showing the sliding table.

FIG. 3 is an exploded perspective view of the sliding table.

FIG. 8 is a partial sectional view of the latching device of this invention in its unlatched state.

FIG. 9 is a partial sectional view of the latching device of this invention in its latched state.

DESCRIPTION OF THE PREFERRED EMBODIMENT

Figure 4:
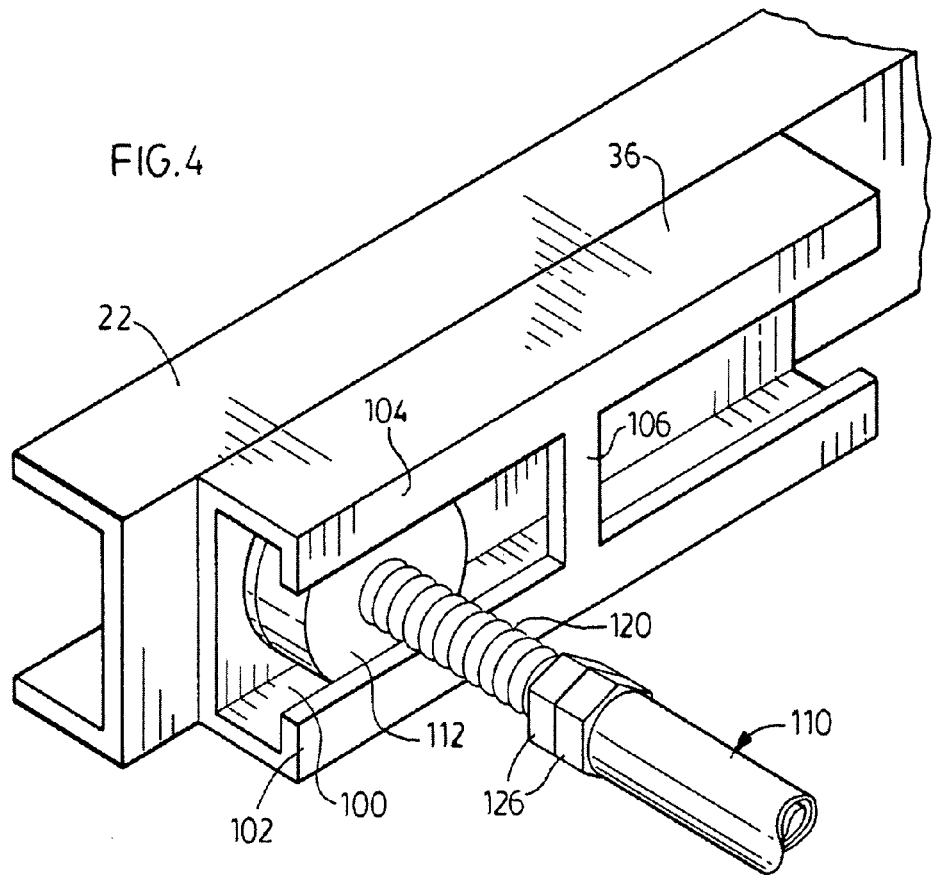
FIG. 4 is a perspective view of the jackscrew and the associated mounting channel used to stabilize the sliding platform.

Referring now to the drawings, FIG. 1 shows an elevational view of a motor vehicle 10 having the sliding platform 12 mounted in the rear cargo space of the vehicle 10. The sliding platform comprises a sliding frame 14 to which the flat top 16 is fastened and is shown protruding from the rear of the cargo bay in its extended position.

FIG. 2 shows the same vehicle 10 in a plan view. Here platform or table 16 is shown in its extended position and the stationary frame 18 is shown mounted in cargo area 20 of vehicle 10.

FIG. 3 shows the sliding table components in an exploded perspective view. A stationary frame 18 is shown having side channel members 22, 24 to which cross pieces 26, 28 and 30 are attached to form a unitary structure.

The side channels 22 and 24 are each supplied with low friction bearings 32 and 34 at the rear of the frame 18 for carrying the sliding frame 14 thereon. A pair of stabilizing channels 36 and 38 are securely fastened to the channels 22 and 24 respectively as shown in FIG. 3.

Sliding frame 14 comprises a pair of angle members 40 and 42 to which are attached the cross pieces 44, 46 and 48. A pair of low friction bearings 51 (one of which are shown) are mounted at the front of member 14.

Lastly, a table top 16 is fastened to sliding frame 14. The top 16 may be fastened by gluing or screwing to the sliding frame 14.

A latching member 50 is provided to lock the sliding member 14 in place on member 18 when the device of this invention is in its forward position. Here a handle 52 is provided on the end of shaft 54 in such a manner that it is nestled in a "rest" position close to cross member 44. Shaft 54 is spring loaded to maintain the handle 52 in this "rest" position.

When it is desired to roll the member 14 into its extended position, handle 52 is grasped and pulled so as to move away from cross member 44 to compress spring 56. Shaft 54 moves axially in cross pieces 44, 46 and 48 and also in link 60 of latch 50. Link 60 is pivotally connected to link 62 by pivot pin 64. Link 62 is pivotally connected to plunger 66 which passes through guide member 68. Plunger 66 is spring loaded by spring 70 to cause shaft end 72 to protrude from member 40 as far as possible. The end 72 of plunger 66 will engage hole 74 in channel member 22 of stationary frame 18, if the sliding frame 14 is in its forward position.

Figure 5:
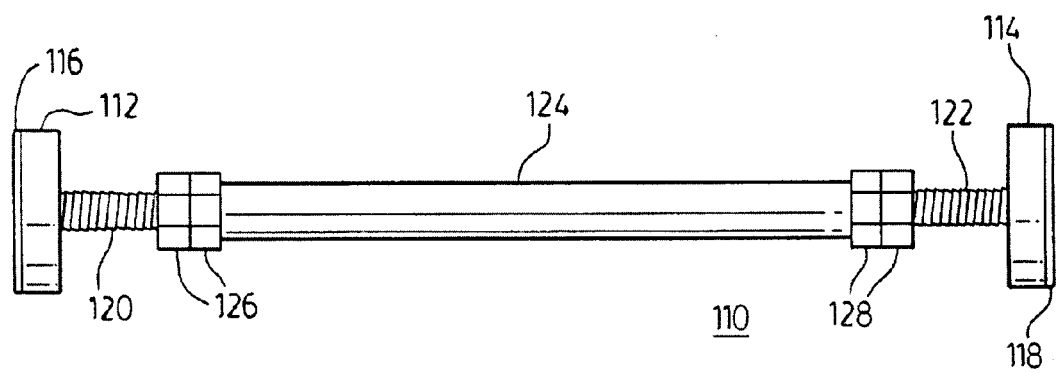
FIG. 5 is a view of the jackscrew of this invention.

Referring now to FIGS. 4 and 5, the rear stabilizers for frame 18 will be described.

Attached to channels 24 and 26 are a pair of channel members 36 and 38. Members 36 and 38 are usually attached to members 24 and 26 by welding, but other methods may be employed as long as the members 36 and 38 are securely fastened to the frame members 24 and 26.

A jackscrew member 110 is arranged to combine with one of the channels 36 or 38 to locate the bottom frame member 18. Jackscrew 110 has a pair of threaded head members 112, 120 and 114 and 122 which slidably fit into tube 124 at the ends thereof. Nuts 126, 128 permit the distance between heads 112 and 114 to be increased or decreased. Heads 112 and 114 are provided with captive plastic washers 116 and 118 at each end thereof.

In order to install the sliding platform 12 in the cargo bay of a pick-up vehicle, the device 12 is located in the cargo bay of a pick-up truck at the desired position for installation.

Jackscrew members 110 are installed with the head 112 captured in the channel 36 as shown in FIG. 4. The second jackscrew member is installed in channel 38 in the same manner. The lengths of the jackscrew members 110 are adjusted to temporarily locate frame 18 in a desirable position for installation. It is noted that the adjustable jackscrews 110 are provided to press against walls 20 of the cargo bay and thus stabilize the rearward portion of frame member 18 against any horizontal shifting.

When the rearward portion of frame member 18 is stabilized, the bolts 88 may be installed to stabilize the front of the frame member 18.

Figure 6:
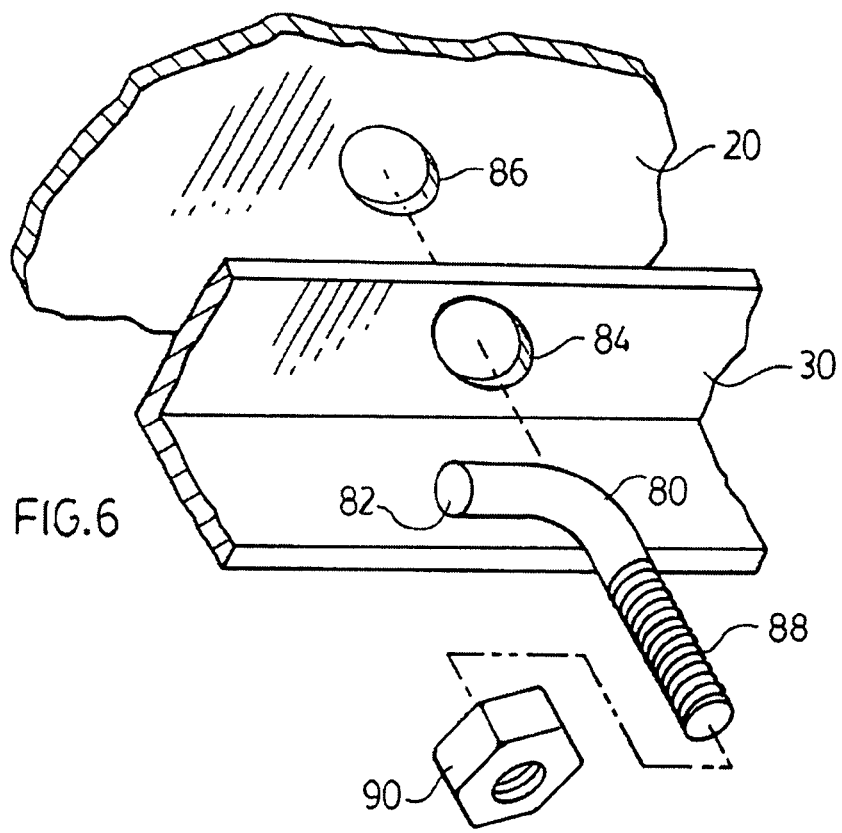
FIG. 6 is a perspective view of the fastening device used in association with this invention showing the locking device retracted.
Figure 7:
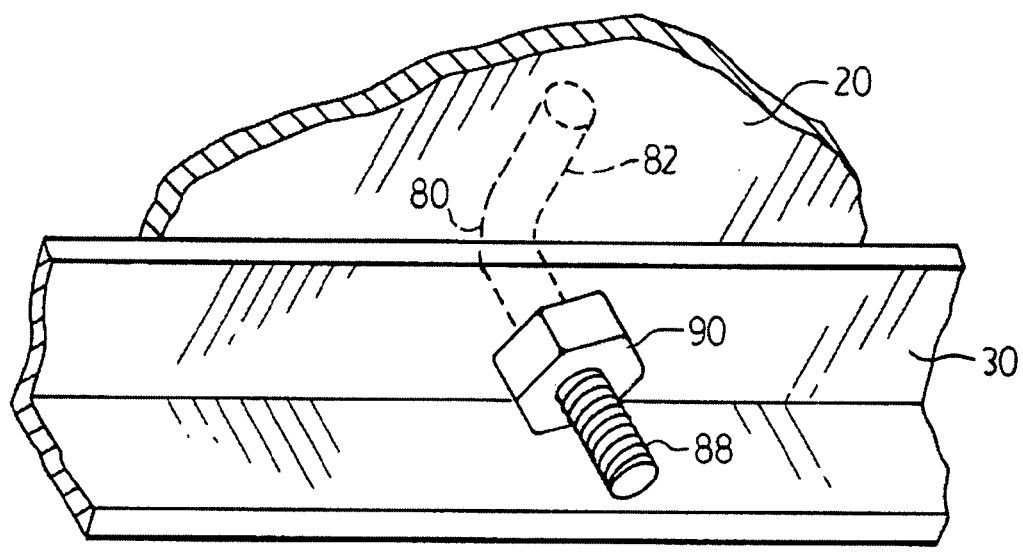
FIG. 7 shows the fastening device of FIG. 6 in its installed state.

The frame member 18 has been placed in the desired position for installation, and that will mean that horizontal angle member 30 is resting against front wall 20 of the cargo bay. (See FIGS. 6 and 7.) With the rear portion of frame 18 held against horizontal shifting by members 110, holes 86 are drilled in the wall 20 of the cargo bay. The holes 84 and 86 are the same size and are intended to be large enough to provide clearance for the installation of bolt members 88. Bolt members 88 are L shaped and the unthreaded portion 82 of bolt 88 is inserted into the two holes 84 and 86 and then bolt 88 is twisted through a right angle to the position shown in FIG. 7. Nut 90 is then advanced to secure the member 30 against wall 20. A second bolt member 88 is installed in the second hole in angle member 30 and front wall 20 of the cargo bay to complete the installation of the front of frame 18 in the cargo bay.

It is now necessary to return to jackscrews 110 to provide the final adjustment and tightening of the devices 110 installed in frame member 18 to provide its permanent location. The two jackscrews are tightened and locked in position by lock nuts 126 and 128. This holds the rear of frame 18 in a state of compression between the walls of cargo bay 20.

Each head 112, 114 is provided with a captive plastic washer 116, 118 to provide a smooth installation of members 110 in the walls 20 of the channels 36, 38 of frame 18 and cargo bay.

The main advantage of the present invention is that the installation of the sliding platform is such a simple operation when compared to the prior art models.

First it is easy to accurately drill the clearance holes such as 86 in the front wall of the cargo bay 20 using the clearance holes 84 already provided in cross member 30 as a drilling guide.

Next, because of the peculiar shape of bolts 80, there is no need of having a service person trying to gain access to the area of the cargo bay on the side opposite the device 12 of this invention to install the fastening devices for the installation of device 12 to the cargo bay 20. The use of the stabilizers such as 110 on each side of frame 18 permits the speedy stabilization of the frame 18 in the cargo bay of the vehicle.

Referring to FIGS. 8 and 9, which show the locking portion of latch 50 in section, here shaft 54 which is slidably mounted in link 60 and is rotated to draw plunger 66 to the left as shown in FIG. 8. Plunger 66 is spring loaded by spring 70 to urge plunger 66 to the right. Plunger 66 passes through guide 68 and through hole 90 in angle 40.

When shaft 54 returns to its rest position as shown in FIG. 9, as determined by spring 70, the end 72 of plunger 66 passes through hole 74 in stationary frame member 22. This locks the upper frame 16 into stationary frame member 18.

What are the advantages of this construction? This sliding platform may be installed permanently in the cargo bay of a vehicle by drilling only two holes in the front wall of the cargo bay. The use of L shaped bolts secures the front of the stationary frame 18 to the front wall of the cargo bay. It will be found that the fastening devices do not require a second person to hold the end of the fastening device outside the cargo box. The use of the stabilizers in channels 36 and 38 permits the swift stabilization of frame 18 in the cargo bay to complete the installation.

Other prior art models require a bolt to be vertically passed through a member such as 28 and through a hole drilled in the floor of the cargo bay. This is clumsy and time consuming because:

First access must be gained to the area where the hole is to be drilled in the floor of the cargo bay. This usually requires that table top 16 be removed from sliding frame 14 to gain such access.

Next a hole must be accurately drilled in the floor of cargo bay 20 once access is gained to a member such as 28. Then a bolt must be fed through member 28 and the floor of the cargo bay 20. Someone has to gain access to the vertically extending bolt to thread a nut onto the bolt and tighten it.

Note that the holes such as 86 at the front of the cargo bay are quite easy to provide, because holes 84 and 86 are in close proximity once the stationary frame 18 has been properly set in cargo bay 20 of vehicle 10.

Table top 16 must be removed from sliding frame 14 in prior art devices in order to install a bolt in the floor of cargo bay 20. A hole must be drilled in the floor of the cargo bay and a bolt must be correctly installed to permanently fasten the stationary frame 18 to the cargo bay. This requires a second person to be present during the installation of stationary frame 18 which is both costly and time consuming.

Many modifications and other embodiments of the invention will come to the mind of one skilled in the art having benefit of the teachings presented in the foregoing descriptions and the associated drawings. Therefore, it is to be understood that the invention is not to be limited to the specific embodiments disclosed, and that the modifications and embodiments are intended to be included within the scope of the dependent claims.

What is claimed is:

1. A vehicle extension platform comprising a stationary frame member of such size as to fit into the cargo bay of a vehicle, said cargo bay having at least three vertical walls and a floor for mounting said stationary frame member in said cargo bay, said stationary member being secured in said cargo bay by at least two fastening devices which pass through a front part of the stationary frame member and into the front vertical wall of said cargo bay, said fastening devices having the capability of being tightened from inside the cargo area, means for stabilizing the rear of said vehicle extension platform comprising a pair of adjustable jack screws whose length is adjustable mounted in a pair of mounting devices at the rear of said stationary frame member, and a sliding platform member mounted on said stationary frame member.

2. The vehicle extension platform as claimed in claim wherein said sliding platform member has a latching device comprising a spring loaded plunger which at rest is urged toward an engaging position with said stationary frame member.

3. The vehicle extension platform as claimed in claim 2 wherein said plunger is actuated by an elongated shaft member having an access handle which at rest is urged to a nested position adjacent a member of said stationary frame members remote from said wall.

4. The vehicle extension platform as claimed in claim 3 wherein said access handle may be pulled away from said member to permit easier actuation of said plunger.

5. The vehicle extension platform as claimed in claim 4 wherein said elongated shaft is rotatably mounted in said sliding platform member wherein rotation of said elongated shaft causes said plunger to move in a rectilinear fashion.

* * * * *